US008028189B2

(12) United States Patent
Hsu et al.

(10) Patent No.: US 8,028,189 B2
(45) Date of Patent: Sep. 27, 2011

(54) RECOVERABLE MACHINE CHECK HANDLING

(75) Inventors: Yu-Cheng Hsu, Tucson, AZ (US); John N. McCauley, Tucson, AZ (US); Juan J. Ruiz, Tucson, AZ (US); William G. Sherman, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 10/991,207

(22) Filed: Nov. 17, 2004

(65) Prior Publication Data
US 2006/0107125 A1    May 18, 2006

(51) Int. Cl.
*G06F 11/00* (2006.01)
(52) U.S. Cl. ............................................. 714/5
(58) Field of Classification Search .................. 714/38, 714/5
See application file for complete search history.

(56) References Cited

U.S. PATENT DOCUMENTS

| | | | |
|---|---|---|---|
| 4,888,771 A * | 12/1989 | Benignus et al. ............... 714/26 |
| 5,815,647 A * | 9/1998 | Buckland et al. ................ 714/3 |
| 5,889,965 A * | 3/1999 | Wallach et al. ............... 710/302 |
| 6,189,117 B1 | 2/2001 | Batchelor et al. | |
| 6,557,121 B1 | 4/2003 | McLaughlin et al. | |
| 6,658,599 B1 * | 12/2003 | Linam et al. .................... 714/25 |
| 6,684,346 B2 | 1/2004 | Tu et al. | |
| 6,745,346 B2 | 6/2004 | Quach et al. | |
| 2001/0052042 A1 * | 12/2001 | Wallach et al. ............... 710/103 |
| 2002/0073359 A1 | 6/2002 | Wade | |
| 2002/0144193 A1 | 10/2002 | Hicks et al. | |
| 2003/0061540 A1 | 3/2003 | Lee et al. | |
| 2003/0074601 A1 | 4/2003 | Schultz et al. | |
| 2003/0204780 A1 | 10/2003 | Dawkins et al. | |
| 2004/0003313 A1 | 1/2004 | Ramirez | |
| 2004/0095833 A1 | 5/2004 | Marisetty et al. | |
| 2005/0015672 A1 * | 1/2005 | Yamada ............................ 714/38 |
| 2006/0048005 A1 * | 3/2006 | Gollub et al. .................... 714/25 |
| 2008/0177994 A1 * | 7/2008 | Mayer ............................... 713/2 |

* cited by examiner

*Primary Examiner* — Amine Riad
(74) *Attorney, Agent, or Firm* — Scully, Scott, Murphy & Presser, P.C.

(57) ABSTRACT

A technique for handling hardware errors in a computing system, such as a data storage facility, while avoiding a system crash. An interface is registered with an operating system of the computing system to process hardware errors. When a hardware error is detected, the interface checks an error register to identify the adapter that likely causes the error, and quarantines, e.g., blocks off, the offending adapter from the computing system. The interface then notifies the operating system that the error has been handled, thereby causing the operating system to bypass a system crash that would otherwise occur. The interface can be provided as a kernel extension of a device driver associated with the operating system.

16 Claims, 2 Drawing Sheets

RECOVERABLE MACHINE CHECK HANDLING

BACKGROUND OF THE INVENTION

1. Field of the Invention

The invention relates generally to the field of data storage in computer systems and, more specifically, to a technique for handling hardware errors while avoiding a system crash.

2. Description of the Related Art

A hardware error such as a machine check in a computing system such as a normal UNIX system will cause the system to crash. Normally, it will not even allow applications to have a chance to log any information. When information can be logged, it is used to identify the faulty component only after the image is rebooted. A machine check is always considered as a system fatal error. In a data storage facility, an example of which is the IBM pSeries system, there are many conditions that can cause a machine check, such as target abort, master abort, or parity error. In a general purpose UNIX server, it is reasonable to invoke a machine check for those conditions. The data storage facility becomes temporarily unavailable in such situations.

Furthermore, a multi-cluster data storage facility, an example of which is the IBM TotalStorage ESS storage server, is a closed environment with its own host adapters and device adapters and respective device drivers. If any of these hardware adapters causes a peripheral component interconnect (PCI) error such as a target abort, the entire cluster, or computer-electronic complex (CEC), will be crashed and rebooted. During this time, the data storage facility will run in a single cluster mode. However, this is undesirable since the functionality and performance of the data storage facility is impaired.

Accordingly, it would be desirable to provide a procedure for handling hardware errors in a computing system in a way that enables the system to continue to function, without causing a system crash.

BRIEF SUMMARY OF THE INVENTION

To address these and other issues, the present invention describes a procedure for handling hardware errors in a computing system such as a data storage facility. The invention defines a new interface for an application to notify the operating system of the computing system that a machine check, such as one caused by a PCI error, is properly handled, such as by resetting or fencing the adapter, so the operating system will bypass a system crash due to a machine check.

In one aspect, the invention provides a method for deploying computing infrastructure that includes integrating computer-readable code into a computing system having a plurality of hardware adapters, where the code in combination with the computing system is capable of processing hardware errors of the hardware adapters by performing a method. The method includes: (a) detecting, at an interface to an operating system of the computing system, a hardware error in the computing system, (b) responsive to the detecting, determining at least one of the hardware adapters that potentially generated the hardware error, and quarantining the at least one of the hardware adapters, and (c) following the quarantining, completing a handling of the hardware error without invoking a crash of the computing system.

In another aspect, a data storage facility includes an error register for registering errors generated by a plurality of hardware adapters, and at least one cluster comprising at least one processor executing computer-readable code to provide an operating system, and an interface to the operating system. The interface detects a hardware error in the computing system, checks the error register to determine at least one of the hardware adapters that potentially generated the hardware error, and quarantines the at least one of the hardware adapters. Following the quarantining, the operating system completes a handling of the hardware error without invoking a crash of the data storage facility.

Related program storage devices may also be provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
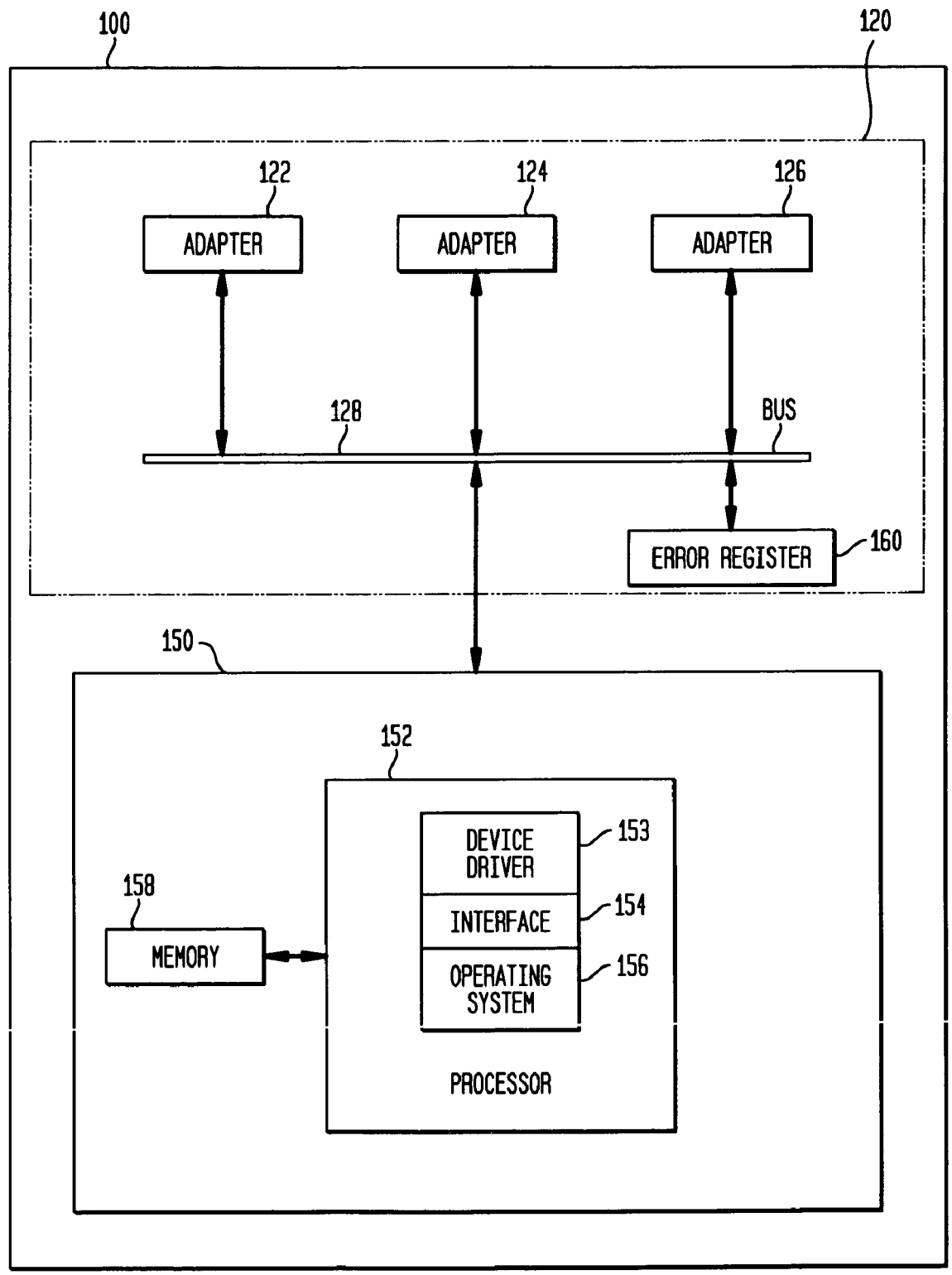
FIG. 1 illustrates a computing system according to the invention.

FIG. 1 illustrates a computing system according to the invention. A computing system 100 may be a data storage facility, for example, which is used for backing up customer data from a number of server hosts. The computing system 100 includes an input/output (I/O) subsystem or fabric 120 including a number of hardware adapters 122, 124 and 126 that communicate with a bus 128 such as a PCI bus. The hardware adapters 122, 124 and 126 may provide connectivity between a cluster 150, also referred to as a computer-electronic complex (CEC), and any number of hardware components. Generally, a CEC is a piece of hardware that may run multiple images/partitions/virtual servers. For example, device adapters can connect to storage disks used by a data storage facility to back up data. Host adapters are external interfaces for sending data to, and receiving data from, external hosts or an additional, remote data storage facility. For instance, the host adapters may support two ports, e.g., either small computer systems interface (SCSI) or IBM's enterprise systems connection (ESCON), which is an Enterprise Systems Architecture/390 and zSeries computer peripheral interface. A fibre channel or fibre-channel connection (FICON) having support for one channel per host adapter may also be used. Hardware adapters may also be used to connect to other devices such as a local host workstation, internal fans, and so forth. For a dual- or other multi-cluster data storage facility, each device adapter and host adapter can connect to each cluster for fail-safe operation.

The bus 128 communicates with the cluster 150. Note that the arrangement shown is a simplified example. In practice, there can be many more adapters and other components. The cluster 150 includes a processor 152, which executes instructions such as software, firmware, and/or micro code stored in at least one program storage device such as a memory 158 to provide the functionality described herein. In particular, an operating system 156, interface 154 and device drivers 153, are depicted as running on the processor 152. An example of the device driver is the IBM ESS driver. For a multi-cluster data storage facility, the arrangement for the cluster 150 can be repeated for each cluster.

Customer data can be provided to the cluster 150 via the adapters 122, 124 and 126 and bus 128. Moreover, the adapters 122, 124 and 126 each have the ability to generate error messages, which are registered in an error register 160. The error register 160 in shown provided in the I/O fabric 120, e.g., as a peripheral component to the bus 128, but may alternatively be located in the cluster 150, for instance. When multiple buses are used, a different error register may be provided for each bus. In particular, the errors may be hardware errors such as a machine check errors that indicate that the adapter is not able to function properly. Typically, each adapter includes a driver that can detect an error. The error register 160 may include checkers that run in an application-specific integrated circuit (ASIC) chip, looking for violations of the PCI protocol, for instance, and latching any errors.

According to the invention, the interface 154 to the operating system 156 can be provided as part of the applications/device drivers 153 to handle PCI and other hardware errors. In particular, the interface 154, which serves as an error handler, can be provided as a kernel extension to the device driver 153, for instance. When a machine check occurs due to a PCI error, such as a target abort, the interface 154 can check the error register 160 to determine which of the adapters 122, 124 and 126 potentially caused the PCI error. The cause of an error is determined by information logged at the error register 160. The specific information logged is implementation dependent. Note that it may not be possible to identify the source of the error exactly since. For example, an error in the I/O fabric 120, such as a data parity error, may be caused by an adapter or by the fabric itself. The interface 154 at the device drivers 153, which are topology aware, can then invoke a warm start and quarantine the adapter that potentially caused the error.

For a multi-cluster device, the device drivers of each cluster work in concert to initiate a warm start. The warm start involves running a recovery procedure to restart the software on the processor such as the device drivers 153. The quarantining can be achieved by causing a reset or fence, e.g., a power on reset or a re-initialization, to the adapter that potentially caused the error. The quarantining can be concurrent with the warm start. Once the application device driver returns, e.g., completes the warm start, and the error has been quarantined, the operating system 156 will complete the rest of the machine check handling without invoking a system crash. That is, the operating system 156 returns from an interrupt level back to normal operation.

The invention thereby advantageously reduces the incidence of system crash and improves the overall system reliability.

Figure 2:
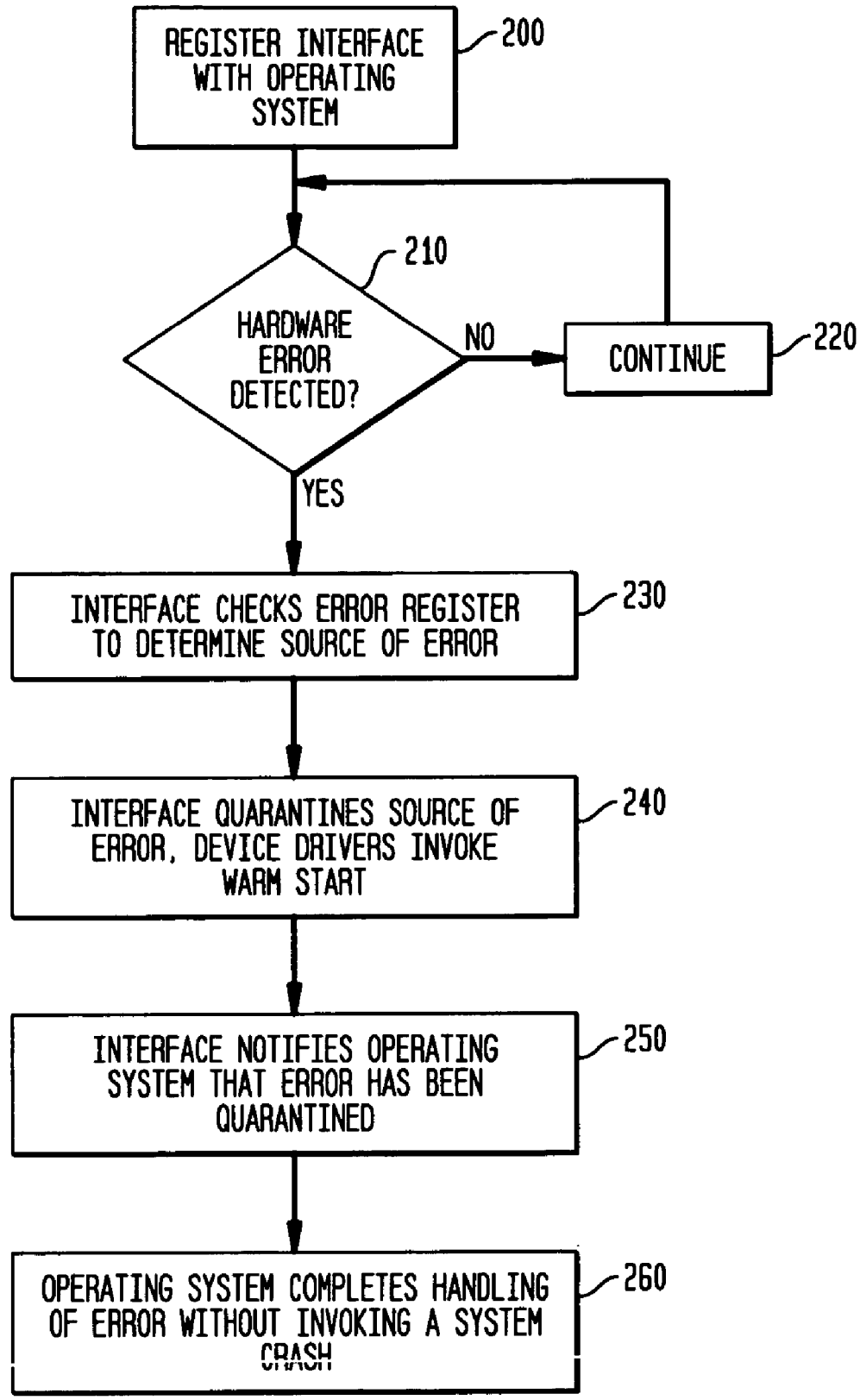
FIG. 2 illustrates a process for handling a hardware error according to the invention.

FIG. 2 illustrates a process for handling a hardware error according to the invention. At block 200, the interface or error handler 160 is registered with the operating system 156. Errors from the I/O fabric 120 can be detected by the interface 154. At block 210, if a hardware error has been detected, it is logged in the error register 160. If no hardware error has been detected, the process is continued (block 220) until an error is detected. Note that this loop is a hardware loop, while the remaining steps involve software control. At block 230, upon detecting the error, the interface 154 checks the error register 160 to determine the source of the error, e.g., one or more of the hardware adapters that potentially generated the error. At block 240, the interface quarantines the source of the error, e.g., the one or more hardware adapters that potentially generated the hardware error, and the device drivers 153 invoke a warm start.

At block 250, the interface notifies the operating system that the error has been quarantined. Note that the interface does not necessarily present all of the information required to deterministically determine the source of the error. Other methods are used in the warm start process. In the IBM ESS, these are part of the AIX pSeries enhanced error handling architecture. The notification may include an error scope (how close or far the error is from the CEC in relation to the adapter), the location of the error (a handle that describes where it is in the logical topology) and some implementation specific error information. At block 260, the operating system completes the handling of the hardware error without invoking a crash, responsive to the notification.

Thus, the interface or error handler is the registered interface, e.g., piece of code, which the operating system (OS) calls on the device driver when there is a problem, such as with the PCI bus slot of a supported adapter. The device driver registers the interface or error handler with the OS such that the OS must invoke the interface when a hardware interrupt associated with the adapter in question surfaces. When an error occurs with the PCI bus where the PCI adapter sits, the device driver error handler queries the error register to help determine the nature of the error on the bus and how to best recover from it.

Note that the invention described herein may be deployed on an existing or new computing infrastructure, such as a data storage facility, cluster or client computing system, by integrating computer-readable code into the computing system, where the code in combination with the computing system is capable of performing a method for achieving the functionality described herein.

Accordingly, it can be seen that the present invention provides technique for handling hardware errors in a computing system while avoiding a system crash. An interface to the operating system of the computing system is provided to process hardware errors by quarantining, e.g., blocking off, the offending adapter from the computing system. The interface then notifies the operating system that the error has been handled, thereby causing the operating system to bypass a system crash that would otherwise occur.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for deploying computing infrastructure, comprising integrating computer-readable code into a computing system having a plurality of hardware adapters, where the code in combination with the computing system processes hardware errors of the hardware adapters by performing a method comprising:

detecting, at an interface to an operating system of the computing system, a hardware error in the computing system;

responsive to the detecting, determining at least one of the hardware adapters that potentially generated the hardware error, and quarantining the at least one of the hardware adapters; and, following the quarantining, completing a handling of the hardware error without invoking a crash of the computing system;

wherein the quarantining is performed by the interface; and the completing of handling of the hardware error is performed by the operating system;

the interface comprises a kernel extension of a device driver associated with the operating system; and, the quarantining comprises resetting the at least one of the hardware adapters and invoking a warm start of device drivers associated with the operating system responsive to the detecting of the hardware error.

2. The method of claim 1, wherein: the quarantining comprises fencing the at least one of the hardware adapters.

3. The method of claim 1, further comprising: providing a notification from the interface to the operating system indicating that the at least one of the hardware adapters has been quarantined; wherein the operating system performs the completing of the handling of the hardware error responsive to the notification.

4. The method of claim 1, wherein: the hardware error comprises a machine check error.

5. The method of claim 1, wherein: the hardware error comprises an input/output fabric error.

6. The method of claim 1, wherein: the computing system comprises a data storage facility.

7. The method of claim 1, further comprising: registering the interface with the operating system.

8. The method of claim 1, wherein: the determining at least one of the hardware adapters that potentially generated the hardware error comprises checking an error register.

9. A non-transitory storage device tangibly embodying a program of instructions executable by at least one processor to perform a method for processing hardware errors in a computing system having a plurality of hardware adapters, the method comprising: detecting, at an interface to an operating system of the computing system, a hardware error in the computing system; responsive to the detecting, determining at least one of the hardware adapters that potentially generated the hardware error, and quarantining the at least one of the hardware adapters; and following the quarantining, completing a handling of the hardware error without invoking a crash of the computing system;
   wherein the quarantining is performed by the interface; and the completing of handling of the hardware error is performed by the operating system;
   the interface comprises a kernel extension of a device driver associated with the operating system; and, the quarantining comprises resetting the at least one of the hardware adapters and invoking a warm start of device drivers associated with the operating system responsive to the detecting of the hardware error.

10. A method for deploying computing infrastructure, comprising integrating computer-readable code into a computing system having a plurality of hardware adapters, where the code in combination with the computing system processes hardware errors of the hardware adapters by performing a method comprising:
   registering an interface with an operating system of the computing system, said interface comprising a kernel extension of a device driver associated with the operating system;
   detecting, at the interface, a hardware error in the computing system; responsive to the detecting, determining at least one of the hardware adapters that potentially generated the hardware error, and quarantining the at least one of the hardware adapters; and following the quarantining, completing a handling of the hardware error without invoking a crash of the computing system;
   wherein the quarantining is performed by the interface; and the completing of handling of the hardware error is performed by the operating system;
   the interface comprises a kernel extension of a device driver associated with the operating system; and,
   the quarantining comprises resetting the at least one of the hardware adapters and invoking a warm start of device drivers associated with the operating system responsive to the detecting of the hardware error.

11. The method of claim 10, further comprising: providing a notification from the interface to the operating system indicating that the at least one of the hardware adapters has been quarantined; wherein the operating system performs the completing of the handling of the hardware error responsive to the notification.

12. A non-transitory device tangibly embodying a program of instructions executable by at least one processor to perform a method for processing hardware errors in a computing system having a plurality of hardware adapters, the method comprising: registering an interface with an operating system of the computing system, said interface comprising a kernel extension of a device driver associated with the operating system; detecting, at the interface, a hardware error in the computing system; responsive to the detecting, determining at least one of the hardware adapters that potentially generated the hardware error, and quarantining the at least one of the hardware adapters; and following the quarantining, completing a handling of the hardware error without invoking a crash of the computing system;
   wherein the quarantining is performed by the interface; and the completing of handling of the hardware error is performed by the operating system; the interface comprises a kernel extension of a device driver associated with the operating system;
   and, the quarantining comprises resetting the at least one of the hardware adapters and invoking a warm start of device drivers associated with the operating system responsive to the detecting of the hardware error.

13. A data storage facility, comprising: an error register for logging errors generated by a plurality of hardware adapters; and at least one cluster comprising at least one processor executing computer-readable code to provide an operating system, and an interface to the operating system; wherein: the interface detects a hardware error in the computing system, checks the error register to determine at least one of the hardware adapters that potentially generated the hardware error, and quarantines the at least one of the hardware adapters; and following the quarantining, the operating system completes a handling of the hardware error without invoking a crash of the data storage facility;
   wherein, the interface comprises a kernel extension of a device driver associated with the operating system; and, the quarantining comprises resetting the at least one of the hardware adapters and invoking a warm start of device drivers associated with the operating system responsive to the detecting of the hardware error.

14. The data storage facility of claim 13, wherein: the quarantining comprises fencing the at least one of the hardware adapters.

15. The data storage facility of claim 13, wherein: the at least one processor executes the computer-readable code to provide device drivers for the plurality of hardware adapters.

16. The data storage facility of claim 13, wherein: the interface provides a notification to the operating system indicating that the at least one of the hardware adapters has been quarantined; and the operating system performs the completing of the handling of the hardware error responsive to the notification.

* * * * *